United States Patent
Ben-Arie et al.

(10) Patent No.: US 11,934,984 B1
(45) Date of Patent: Mar. 19, 2024

(54) SYSTEM AND METHOD FOR SCHEDULING TASKS

(71) Applicant: Intuit Inc., Mountain View, CA (US)

(72) Inventors: Aviv Ben-Arie, Ramat Gan (IL); Sheer Dangoor, Ramat Gan (IL); Yair Horesh, Kfar Sava (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/900,765

(22) Filed: Aug. 31, 2022

(51) Int. Cl.
- *G06Q 10/00* (2023.01)
- *G06Q 10/0633* (2023.01)
- *H04L 67/50* (2022.01)

(52) U.S. Cl.
CPC ....... *G06Q 10/0633* (2013.01); *H04L 67/535* (2022.05)

(58) Field of Classification Search
CPC ... G06Q 10/0633; G06Q 10/00; H04L 67/535
See application file for complete search history.

(56) References Cited

U.S. PATENT DOCUMENTS

| | | | |
|---|---|---|---|
| 10,860,457 B1* | 12/2020 | Evenson | G06F 11/3495 |
| 11,263,241 B2* | 3/2022 | Rezaeian | G06F 16/285 |
| 2014/0297354 A1* | 10/2014 | Kogiso | G06F 9/46 |
| | | | 705/7.26 |
| 2021/0158268 A1* | 5/2021 | Berg | G06F 16/2465 |
| 2022/0343250 A1* | 10/2022 | Tremblay | G06Q 10/06316 |
| 2022/0414527 A1* | 12/2022 | Pandya | G06F 9/4881 |

OTHER PUBLICATIONS

Massimo Quadrana and Paolo Cremonesi. 2018. Sequence-aware recommendation. In Proceedings of the 12th ACM Conference on Recommender Systems (RecSys '18). Association for Computing Machinery, New York, NY, USA, 539-540. https://doi.org/10.1145/3240323.3241621 (Year: 2018).*
OptaPlanner, "OptaPlanner User Guide"; Aug. 19, 2022 (510 pages).

* cited by examiner

*Primary Examiner* — Hafiz A Kassim
*Assistant Examiner* — Zahra Elkassabgi
(74) *Attorney, Agent, or Firm* — Lathrop GPM

(57) ABSTRACT

A method comprising generating, during multiple user sessions of a first user with a software application, first clickstream data from the multiple user sessions, and extracting, from the first clickstream data, a first plurality of task instances of the first user performing a first plurality of tasks. The method also includes decomposing, from the first clickstream data, each task instance of the first plurality of task instances into a first plurality of steps to obtain a first plurality of decomposed task instances. The first plurality of steps in the first plurality of decomposed task instances are each associated with a timestamp. The method further includes training a first user model with the first plurality of decomposed task instances to learn a user optimal order to perform the first plurality of tasks and presenting, to the first user, the user optimal order to perform the first plurality of tasks.

19 Claims, 6 Drawing Sheets input: {"metadata":"start_timestamp|user_id|session_id",
"clickstream":"timestamp|page_name/element_name, timestamp|page_name/element_name, timestamp|page_name/element_name..."}

SYSTEM AND METHOD FOR SCHEDULING TASKS

BACKGROUND

Many businesses use on-line software platforms to perform a variety of tasks, such as preparing and sending invoices, paying bills, and preparing payroll. This is particularly true for small and medium businesses (SMBs). However, many of these tasks are performed in a poorly planned manner by untrained users. These users often lack the requisite knowledge to schedule work tasks in an optimal manner. The result often is wasted time and reduced productivity of the users.

SUMMARY

In general, in one aspect, one or more embodiments relate to a method comprising generating, during a plurality of user sessions of a first user with a software application, first clickstream data from the plurality of user sessions, and extracting, from the first clickstream data, a first plurality of task instances of the first user performing a first plurality of tasks. The method also includes decomposing, from the first clickstream data, each task instance of the first plurality of task instances into a first plurality of steps to obtain a first plurality of decomposed task instances, wherein the first plurality of steps in the first plurality of decomposed task instances are each associated with a timestamp. The method further includes training a first user model with the first plurality of decomposed task instances to learn a user optimal order to perform the first plurality of tasks and presenting, to the first user, the user optimal order to perform the first plurality of tasks.

In general, in one aspect, one or more embodiments relate to a system comprising a server, a data repository in communication with the server and storing first clickstream data, and a scheduling application. The scheduling application is executable by the server to generate, during a plurality of user sessions of a first user with a software application, first clickstream data from the plurality of user sessions and to extract, from the first clickstream data, a first plurality of task instances of the first user performing a first plurality of tasks. The scheduling application is also executable by the server to decompose, from the first clickstream data, each task instance of the first plurality of task instances into a first plurality of steps to obtain a first plurality of decomposed task instances, wherein the first plurality of steps in the first plurality of decomposed task instances are each associated with a timestamp. The scheduling application is further executable by the server to train a first user model with the first plurality of decomposed task instances to learn a user optimal order to perform the first plurality of tasks and to present, to the first user, the user optimal order to perform the first plurality of tasks.

In general, in one aspect, one or more embodiments relate to a method comprising generating, during a plurality of user sessions of a plurality of users with a software application, clickstream data from the plurality of user sessions and extracting, from the clickstream data, a first plurality of task instances of a first user performing a first plurality of tasks. The method includes decomposing, from the first clickstream data, each task instance of the first plurality of task instances into a first plurality of steps to obtain a first plurality of decomposed task instances, wherein the first plurality of steps in the first plurality of decomposed task instances are each associated with a timestamp. The method also includes training a first user model with the first plurality of decomposed task instances to learn a user optimal order to perform the first plurality of tasks and extracting, from the clickstream data, a second plurality of task instances of the plurality of users performing the first plurality of tasks. The method further includes decomposing, from the clickstream data, each task instance of the second plurality of task instances into a second plurality of steps to obtain a second plurality of decomposed task instances, wherein the second plurality of steps in the second plurality of decomposed task instances are each associated with the timestamp. The method includes training a global model with the first plurality of decomposed task instances to learn a global optimal order to perform the first plurality of tasks, detecting, in the software application, an initiation by the first user to perform the first task, and selecting a selected optimal order from the first user model and the global model. The method also includes presenting, to the first user, the selected optimal order to perform the first plurality of tasks.

Other aspects of the one or more embodiments will be apparent from the following description and the appended claims.

BRIEF DESCRIPTION OF DRAWINGS

FIG. 4 shows a clickstream input in accordance with one or more embodiments.

DETAILED DESCRIPTION

Figure 1:
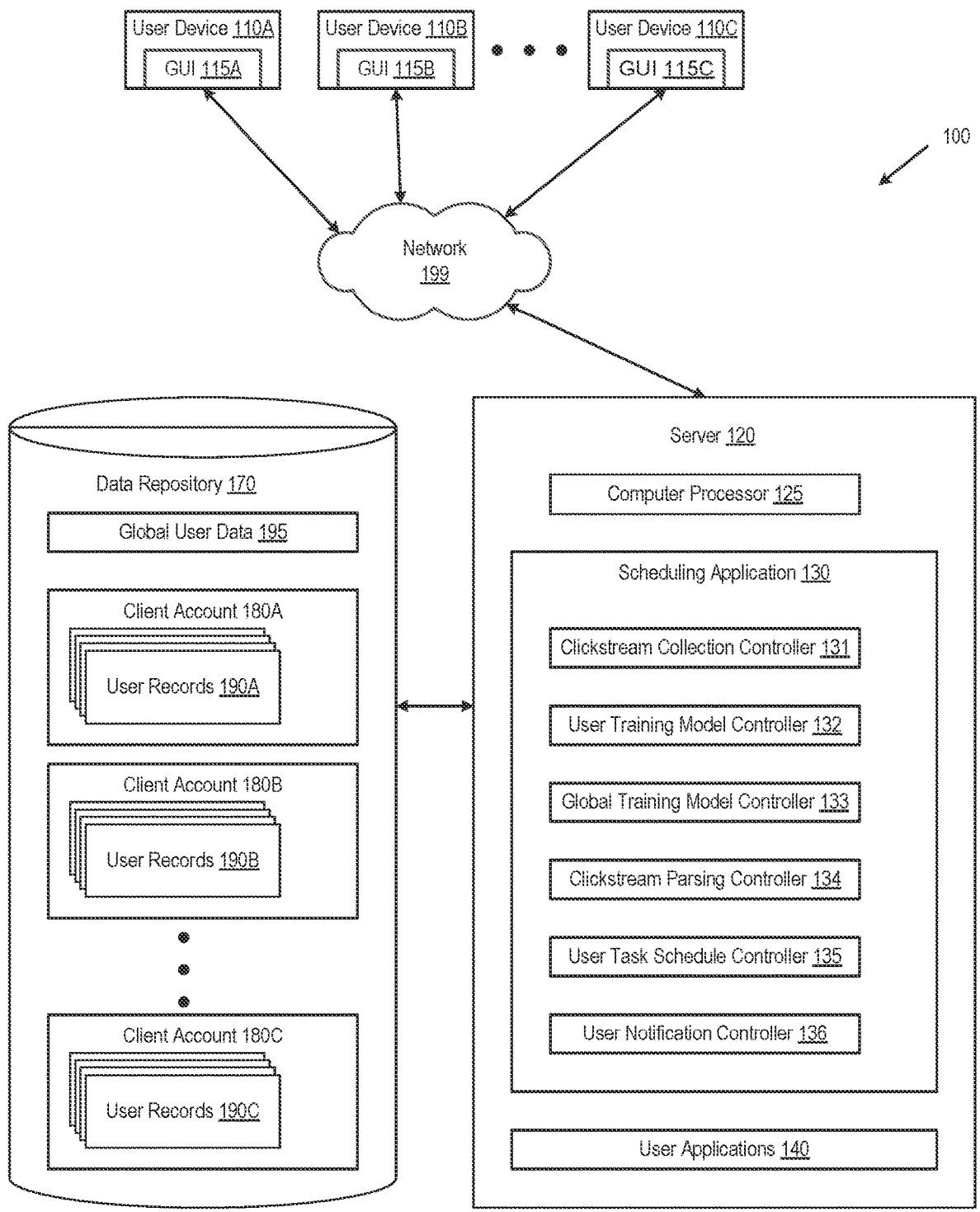
FIG. 1 shows a computing system for scheduling tasks in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities. An entity is an electronic device, not necessarily limited to a computer.

The present disclosure describes a task scheduler and a related method configured to learn which steps make up each task of a multitude of tasks, without creating any additional overhead for the end user. The disclosed task scheduler accomplishes this by capturing and decomposing (or parsing) clickstream data when a user accesses a website. This typically occurs when the user opens a web interface and starts a session on the website. The clickstream data is the information collected about a user while the user browses through the website using a web browser. Clickstream analytics is the process of tracking, analyzing, and reporting data on the pages a user visits and the behavior of a user while the user is on a webpage. Examples of clickstream data may include a User_ID, a time stamp, a type of click event, a name of a product, a category of the product, price information, and a time duration indicating how long a user was on the website.

The disclosed task scheduler learns the steps that compose the multitude of tasks on a global basis (from all users) and refines the multitude of tasks on a user level (e.g., learning the patterns of each user). The disclosed task scheduler also analyzes each user's tasks on, for example, a monthly basis, a weekly basis, or a daily basis. The disclosed task scheduler is configured to break down the multitude of tasks performed each month into steps (according to the preprocessing step described above). The disclosed task scheduler then performs an optimization, such as by grouping tasks with overlapping steps, reordering tasks to reduce duplicated work, etc.

The end result is a report that the disclosed task scheduler sends to the user that suggests an optimal user order in which to perform or distribute the multitude of tasks in the following month(s). The user is able to accept or make edits to the report and finally saves the finalized optimal user order. The disclosed task scheduler is also configured to transmit reminders to a user when it is time to perform each of the multitude of tasks in the following month(s) according to the finalized optimal order and timing. The disclosed task scheduler continues to learn and improve the optimal user order by capturing clickstream data in the following month(s).

In an embodiment, the task scheduler may train algorithms or machine learning models using the clickstream data at the beginning of the task scheduling process and subsequently to update task schedules as the users continue to perform tasks. The task scheduler collects clickstream data from, for example, small and medium business (SMB) accounts over a predetermined period, such as a week, a month, or several months. It may be assumed hereafter that in the SMB environment, most tasks are done monthly. However, this may be altered according to the use case. Clickstream data is collected for actions that are considered "tasks", such as sending invoices to customers, performing payroll, shipping products, and the like. The disclosed task scheduler may collect the User_ID of a session along with the clickstream data and the task "name" which is processed according to the page name (i.e., "Create Invoice") and the task duration (also processed from the clickstream data).

In an embodiment, the task scheduler may decompose the clickstream data into individual "steps" by partitioning the clickstream data using pre-defined delimiters, such as Send/Save buttons. Each step represents an area in the software application that is accessed by the user and the actions that the user performed (e.g., fill a form and click Submit). The task scheduler uses an optimization algorithm (e.g., OptaPlanner) in order to determine the optimal order to perform the tasks. In an embodiment, the optimization algorithm may use the task duration as the target value that the task scheduler minimizes.

In an embodiment, the task scheduler may optimize on a per user basis in which the task scheduler is trained on sets of tasks that are performed by the same person and then stores the optimal results using the User_ID.

In an embodiment, the task scheduler may optimize on a global basis in which the task scheduler uses the entire data set for all user for the optimization, partitioned by the task name. In such a case, the task scheduler optimizes per task across all users. It is understood that many users perform the same tasks. However, some users may perform the tasks faster due to more efficient ordering.

In an embodiment, for every User_ID and task name, the task scheduler may offer a user a suggested task ordering (e.g., via email) by taking the best of the following three options:
  i) The task scheduler may suggest the optimal user ordering that was determined on a per user basis for the same User_ID and task name.
  ii) If the User_ID and task name have not yet been learned (e.g., the user is relatively new), the task scheduler may select the most similar user and use the tasks of the most similar user. The task scheduler may identify the most similar user by using recommendation system algorithms, such as collaborative filtering.
  iii) The task scheduler may use the global optimization solution for that task across all users.

In an embodiment, the task scheduler may e-mail the user a monthly (weekly, daily) schedule with a suggested task ordering. In an interactive graphical user interface (GUI), the task scheduler may allow the user to make changes so the schedule is more suitable to the user. If the user made a change, the task scheduler will update the schedule in the trained optimization data stored for the user. In the way, the next training iteration uses this as the starting point for the user. After the user confirms the suggested schedule, the task scheduler may set notifications to perform the optimized tasks so that user performs the tasks on time and in order.

FIG. 1 shows a computing system (100) for scheduling tasks in accordance with one or more embodiments. The computing system (100) includes a server (120) and a data repository (170) that are coupled through a network (199) to multiple user devices 110, including user device (110A), user device (110B), and user device (110C). In an embodiment, the network (199) may be an internet protocol (IP) network, such as the internet. The server (120) includes a computer processor (125) that is configured to execute one or more of a multitude of user applications (140) and a scheduling application (130) according to one or more embodiments. The scheduling application (130) is described below in greater detail.

The data repository (170) stores a multitude of client account records (180), including client account record (180A), client account record (180B), and client account record (180C). A typical client account record may be associated with a business entity, such as a small business or a medium business. However, this is by way of example and should not be construed to limit the scope of this disclosure. In other embodiments, one or more of client account record (180A), client account record (180B), and client account record (180C) may be associated with a large business entity, a university system, a governmental body, or a large charitable or social organization.

Each of the client account records includes a user record for each of the users associated with the small or medium business. Client account record (180A) includes a multitude of user records, including user record (190A). Client account record (180B) includes a multitude of user records, including user record (190B). Client account record (180C) includes a multitude of user records, including user record (190C). Each of the user records includes data used by the scheduling application (130). For example, for a first user, user record (190A) may store the collected clickstream data of the first user as well a task report that includes a user optimal order for performing a multitude of tasks.

The user devices (110A, 110B, 110C) are computing systems, such as, for example, desktop computers, mobile devices, laptop computers, tablet computers, server computers, etc. The user devices (110A, 110B, 110C) include hardware components and software components that operate as part of the computing system (100). The user devices (110A, 110B, 110C) communicate with the server (120) to access and to execute one or more user applications (140) in server (120). By way of example and not limitation, user applications (140) may include a Send Invoice application, a Payroll application, a Ship Product application, etc. The user devices (110A, 110B, 110C) may communicate with the server (120) using standard protocols and file types, which may include hypertext transfer protocol (HTTP), HTTP secure (HTTPS), transmission control protocol (TCP), internet protocol (IP), hypertext markup language (HTML), extensible markup language (XML), etc.

The user devices (110A, 110B, 110C) respectively include graphical user interface (GUI) applications (115A, 115B, 115C). The GUI applications (115A, 115B, 115C) respectively running on the user devices (110A, 110B, 110C) may include web browser applications that are configured to access server (120) and to initiate a session with one or more of the user applications (140). In an embodiment, when the computer processor (125) detects that a GUI application (115) has accessed the server (120) and/or initiated a session with a user application (140), the computer processor (125) may respond by launching the scheduling application (130), which will begin to capture clickstream data and optimize the order of user tasks, as described below in greater detail.

The scheduling application (130) is a collection of programs that may execute on multiple servers of a cloud environment, including the server (120). In one embodiment, the server application (115) includes a clickstream collection controller (131), a user training controller (132), a global training model controller (133), a clickstream parsing controller (134), a user task schedule controller (135), and a user notification controller (136).

The clickstream collection controller (131) is a set of hardware and software components of the scheduling application (130). The computer processor (125) executes the clickstream collection controller (131) to collect (or capture) clickstream data for all users over a predetermined period, such as a week, a month, or several months. The collected clickstream data for each individual user is stored in a corresponding user record (190) in data repository (170). Additionally, the collected clickstream data for all users is also stored in a global user data record (195). The clickstream collection controller (131) collects clickstream data for user actions that are considered "tasks", such as sending invoices to customers, performing payroll, shipping products, and the like. The clickstream collection controller (131) also collects the User_ID of a session, the task "name" which is processed according to the page name (i.e., "Create Invoice"), and the task duration (also processed from the clickstream data).

The computer processor (125) executes the user training model controller (132) to train algorithms or machine learning models on the clickstream data for a single user in order to determine a user optimal order for performing a multitude of tasks. The computer processor (125) executes the global training model controller (133) to train algorithms or machine learning models on the clickstream data for all users in order to determine a global optimal order for performing a multitude of tasks.

The clickstream parsing controller (134) is a set of hardware and software components of the scheduling application (130). The computer processor (125) executes the clickstream parsing controller (134) to extract from the clickstream data a multitude of task instances of a user performing the multitude of tasks. The computer processor (125) further executes the clickstream parsing controller (134) to decompose, from the clickstream data, each task instance of the multitude of task instances into a multitude of steps to obtain a multitude of decomposed task instances. The clickstream parsing controller (134) also extracts timestamps from the clickstream data. Each of the multitude of steps in the multitude of decomposed task instances is associated with a timestamp.

The user task scheduler controller (135) is a set of hardware and software components of the scheduling application (130). The computer processor (125) executes the user task scheduler controller (135) to generate a task schedule for each user based on the user optimal order for performing a multitude of tasks. The user task scheduler controller (135) may e-mail each user a periodic schedule (e.g., monthly, weekly, daily) based on the suggested user optimal ordering of tasks that is adapted to each user. The user task scheduler controller (135) may send an editable document that allows each user to make changes to the schedule.

The user notification controller (136) is a set of hardware and software components of the scheduling application (130). The computer processor (125) executes the user notification controller (136) to generate notifications that are send to each user at selected times according to the schedule for each user. Additionally, the user notification controller (136) may present tooltips on the GUI (115) of a user device (110) to prompt each user.

Figure 2:
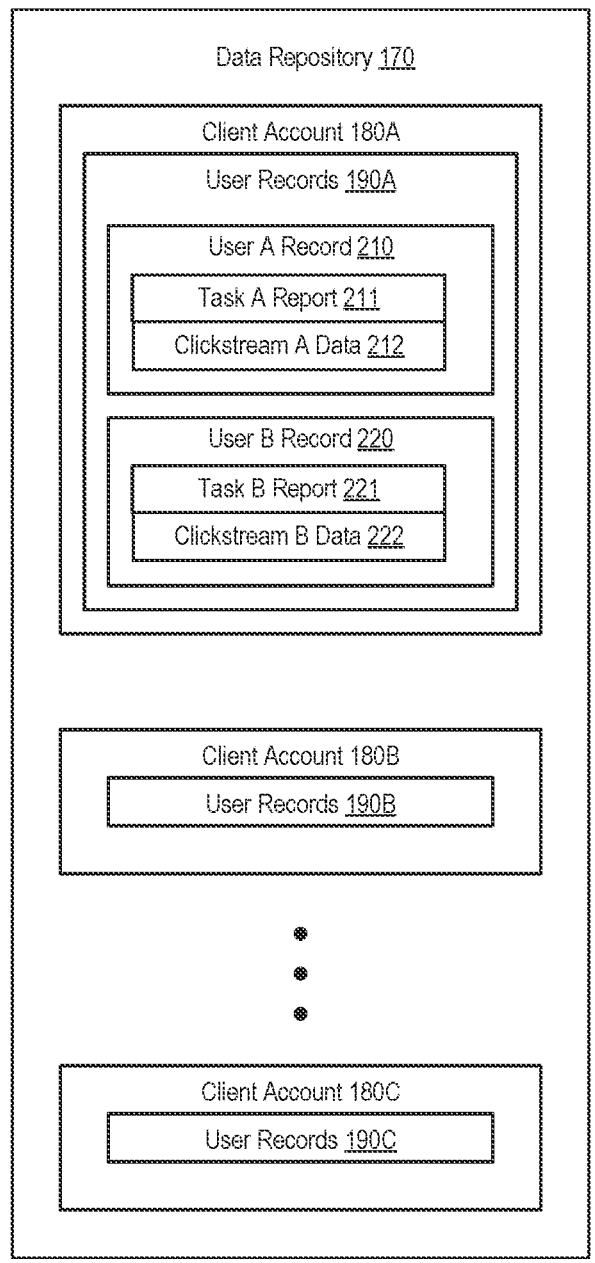
FIG. 2 shows user records in a data repository in accordance with one or more embodiments.

FIG. 2 shows user records (190) stored, for example, in the data repository (170) in accordance with one or more embodiments. An example client account (180A) includes user records (190A). User records (190A) may include user records for two example users: User A and User B. User A record (210) includes task A report (211) and clickstream A data (212). Task A report (211) includes the periodic schedule based on the suggested user optimal ordering of tasks for User A. Clickstream A data 212 contains the decomposed clickstream data and decomposed task instances for the clickstream data for User A. User B record (220) includes task B report (221) and clickstream B data (222). Task B report (221) includes the periodic schedule based on the suggested user optimal ordering of tasks for User B. Clickstream B data 222 contains the decomposed clickstream data and decomposed task instances for the clickstream data for User BA.

Figure 3:
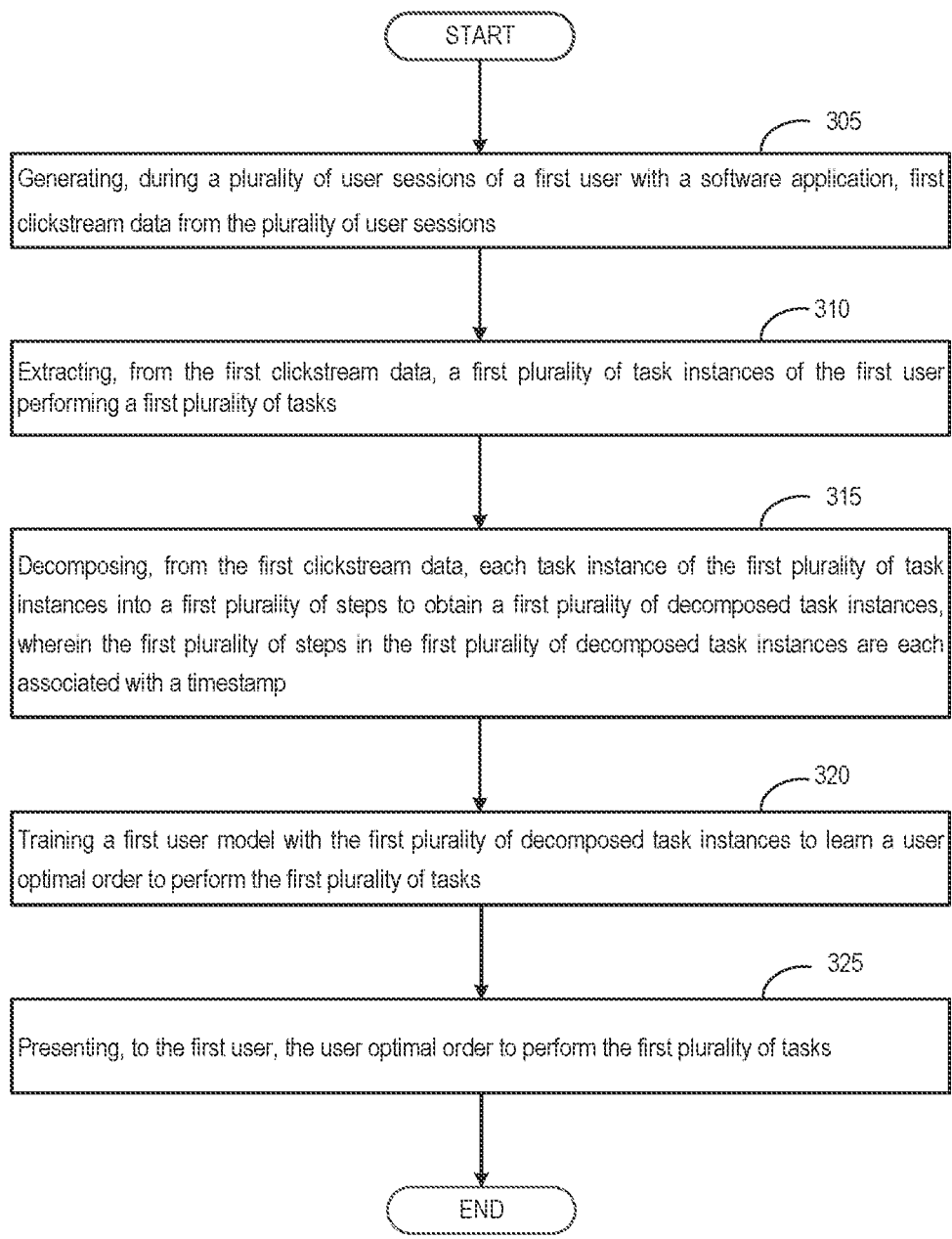
FIG. 3 shows a flow diagram for scheduling tasks in accordance with one or more embodiments.

FIG. 3 shows a flow diagram for scheduling tasks in accordance with one or more embodiments. In (305), the scheduling application (130) generates, during a multitude of user sessions of a first user with a software application, first clickstream data from the multitude of user sessions. In (310), the scheduling application (130) extracts, from the first clickstream data, a first multitude of task instances of the first user performing a first multitude of tasks. In (315), the scheduling application (130) decomposes, from the first clickstream data, each task instance of the first multitude of task instances into a first multitude of steps to obtain a first multitude of decomposed task instances. The first multitude of steps in the first multitude of decomposed task instances are each associated with a timestamp. In (320), the scheduling application (130) trains a first user model with the first multitude of decomposed task instances to learn a user optimal order to perform the first multitude of tasks. In (325), the scheduling application (130) presents, to the first user, the user optimal order to perform the first multitude of tasks.

In an embodiment, the scheduling application (130) may further detect, in the software application, an initiation by the first user to perform a task in the first multitude of tasks, where the user optimal order is presented responsive to the detection. In an embodiment, the scheduling application (130) may train the first user model by determining a dependency relationship between the first multitude of steps based on commonalities in an order of performing the first multitude of steps across the first multitude of decomposed task instances. The scheduling application (130) may generate, based on the dependency relationship, the user optimal order that minimizes a duration for the first user to perform the first multitude of tasks.

In an embodiment, the scheduling application (130) may train the first user model by determining a redundancy in a first step in the first multitude of tasks and a second step in the first multitude of tasks and generating, based upon the redundancy, the user optimal order that removes the redundancy.

In an embodiment, the user optimal order may be different than the first user performing the first multitude of steps in any of the first multitude of task instances.

In an embodiment, the scheduling application (130) may further detect, in the software application, an initiation by a second user to perform the task having the task identifier. The scheduling application (130) may determine, for the second user, that a second user model does not exist for the task. In response, the scheduling application (130) may select, for the second user, the first user model based on a determined similarity between the first user and the second user. The scheduling application (130) presents to the second user the user optimal order to perform the task.

In an embodiment, the scheduling application (130) may present the user optimal order by displaying, in the GUI (115) of the software application, a step-by-step list of the multitude of steps ordered according to the user optimal order. For at least a subset of steps, each step in the step-by-step list is displayed once a prior step is completed.

In an embodiment, the scheduling application (130) may obtain second clickstream data of a multitude of users and extract, from the second clickstream data, a second multitude of task instances of the multitude of users performing the first multitude of tasks. The scheduling application (130) may decompose, from the second clickstream data, each task instance in the second multitude of task instances into a second multitude of steps to obtain a second multitude of decomposed task instances. The multitude of steps in the multitude of decomposed task instances are each associated with the timestamp. The scheduling application (130) may train a global model with the second multitude of decomposed task instances to learn a global optimal order to perform the first multitude of tasks. The scheduling application (130) may detect, in the software application, an initiation by a second user to perform a task and determine, for the second user, that a second user model does not exist for the task. The scheduling application (130) may select, for the second user the global model and present, to the second user, the global optimal order to perform the first multitude of tasks.

In an embodiment, the scheduling application (130) may relate each of the second multitude of task instances to a corresponding task identifier of a corresponding task in the multitude of tasks. The scheduling application (130) extracting the first multitude of task instances comprises selecting a subset of the second multitude of task instances having the task identifier be the same amongst the task instances in the subset. In an embodiment, the scheduling application (130) relates a task instance of the second multitude of task instances to the corresponding task identifier by extracting, from the first clickstream data, a multitude of page identifiers of a multitude of user interface pages of the software application. The scheduling application (130) matches at least one page identifier of the multitude of page identifiers to the corresponding task identifier in a mapping structure.

In an embodiment, the scheduling application (130) filters the clickstream data at a page level granularity. In an embodiment, the scheduling application (130) identifies in the first clickstream data from each user session a multitude of timestamps. The multitude of timestamps may include an initial timestamp indicating the start of the task during a user session and an end timestamp indicating the end of the task. The scheduling application (130) calculates a duration of time to perform the task based on the initial timestamp and the end timestamp and uses the duration of time to train the first user model.

FIG. 4 shows a clickstream input (400) in accordance with one or more embodiments. The clickstream input (400) includes a "metadata" field and a "clickstream" field. Two delimiters, <, > and <1>, are used in the clickstream input (400). A first delimiter <, > separates the "metadata" field and the "clickstream" field. Within the "metadata" field, a second delimiter <1> separates a "Start_timestamp" data, a "User_ID" data, and a "Session_ID" data. Within the "clickstream" field, the first delimiter <, > separates three groups of "timestamp 1 page name 1 element_name" and the second delimiter <1> separates the "timestamp" data, the "page name" data, and the "element name" data.

Figure 5:
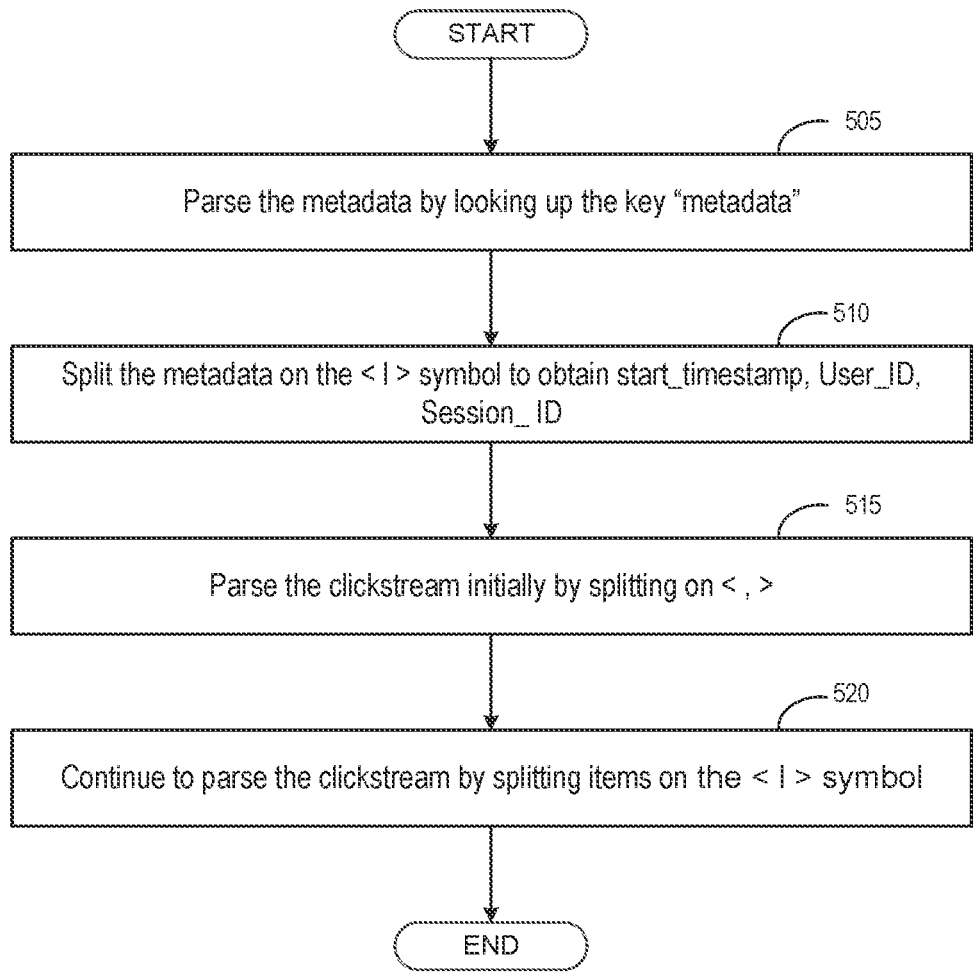
FIG. 5 shows a flow diagram illustrating the parsing of the clickstream input in accordance with one or more embodiments.

FIG. 5 shows a flow diagram illustrating the decomposition (or parsing) of the clickstream input (400) in accordance with one or more embodiments. In (505), the scheduling application (130) decomposes or parses the metadata by looking up the key "metadata" in the clickstream input (400). In (510), the scheduling application (130) splits the metadata on the <1> delimiter to obtain the start_timestamp data, the User_ID data, and the Session_ID data. In (515), the scheduling application (130) parses the clickstream data initially by splitting on the <, > delimiter. Finally, in (520), the scheduling application (130) continues to parse the clickstream data by splitting the items on the <1> delimiter.

In an embodiment, the scheduling application (130) may include an optimizer engine, such as OptaPlanner, in order to determine the optimal order to perform the decomposed task instances. The scheduling application (130) may be configured to optimize on a specific target, e.g., total time of the task, which may be calculated by using the clickstream input (400) data: (max(timestamp)−start_timestamp). The sequence to optimize may be a list of the page names and element names, ordered, from the parsed input data An example of an input to the optimization engine of the scheduling application (130) may be: "Target: 300 seconds, Data: sign_in, invoice_creation, add_line_item, add_line_item, submit_invoice".

The disclosed task scheduler and related method may break the clickstream data into smaller steps and apply filter criteria to the clickstream data to filter on, for example, page access or filter on field resolution. The disclosed task scheduler and related method leverage clickstream data for the benefit of the end user. Clickstream data is often used for internal benefit such as marketing or fraud detection. Thus, the user does not need to supply any information because the data collection is completely passive and done in the background. The task scheduler is tailored to each user, but leverages large scale data, as many tasks and behaviors are common across many SMBs.

Figure 6A:
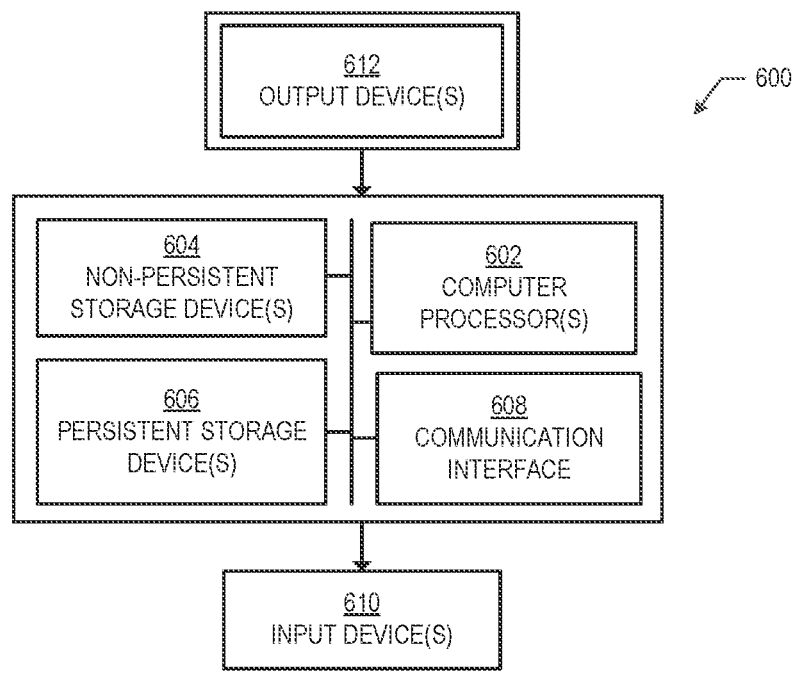
FIG. 6A and FIG. 6B show a computing system in accordance with one or more embodiments of the invention.
Figure 6B:
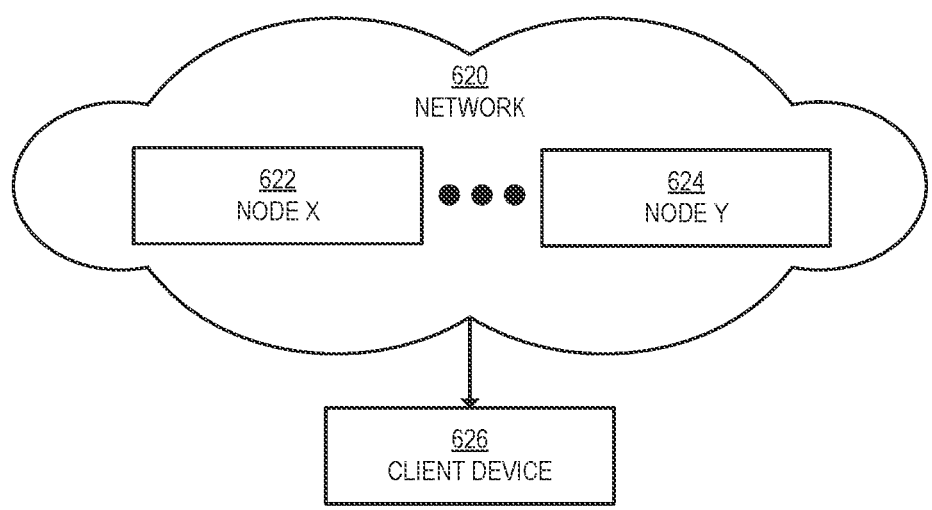

FIG. 6A and FIG. 6B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processor(s) (602), non-persistent storage device(s) (604) (e.g., volatile memory, such as random access memory (RAM), cache memory), persistent storage device(s) (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), and numerous other elements and functionalities that implement the features and elements of the disclosure.

The computer processor(s) (602) may be an integrated circuit for processing instructions. For example, the computer processor(s) (602) may be one or more cores or micro-cores of a processor. The computing system (600) may also include one or more input device(s) (610), such as a touchscreen, a keyboard, a mouse, a microphone, a touchpad, an electronic pen, or any other type of input device.

The communication interface (608) may include an integrated circuit for connecting the computing system (600) to a network (not shown) (e.g., a local area network (LAN), a wide area network (WAN) such as the Internet, a mobile network, or any other type of network) and/or to another device, such as another computing device.

Further, the computing system (600) may include one or more output device(s) (612), such as a screen (e.g., a liquid crystal display (LCD), a plasma display, a touchscreen, a cathode ray tube (CRT) monitor, a projector, or other display device), a printer, an external storage, or any other output device. One or more of the output device(s) (612) may be the same or different from the input device(s) (610). The input and output device(s) (610 and 612) may be locally or remotely connected to the computer processor(s) (602), the non-persistent storage device(s) (604), and the persistent storage device(s) (606). Many different types of computing systems exist, and the aforementioned input and output device(s) (610 and 612) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system (600) shown in FIG. 6A, or a group of nodes combined may correspond to the computing system (600) shown in FIG. 6A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system (600) shown in FIG. 6A. Further, the client device (626) may include and/or perform all or a portion of the one or more embodiments.

The computing system (600) or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a URI within a web client of the user device, thereby initiating a Hypertext Transfer Protocol (HTTP) or other protocol request being sent to the network host associated with the URI. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URI may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (600) in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (600) of FIG. 6A, while performing the one or more embodiments, may perform data comparison. Data comparison may be used to compare two or more data values (e.g., A, B). For example, one or more embodiments may determine whether A >B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A >B, B may be subtracted from A (i.e., A−B), and the status flags may be read to determine if the result is positive (i.e., if A >B, then A−B >0). In one or more embodiments, B may be considered a threshold, and A is deemed to satisfy the threshold if A=B or if A >B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (600) in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g., join, full join, count, average, etc.), sorts (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (600) of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (600) of FIG. 6A and the nodes (e.g., node X (622), node Y (624)) and/or client device (626) in FIG. 6B. Other functions may be performed using one or more embodiments.

While the one or more embodiments have been described with respect to a limited number of embodiments, those skilled in the art, having benefit of this disclosure, will appreciate that other embodiments may be devised which do not depart from the scope of the one or more embodiments as disclosed herein. Accordingly, the scope of the one or more embodiments should be limited only by the attached claims.

What is claimed is:

1. A method comprising:
generating, during a plurality of user sessions of a first user with a graphical user interface of a software application, first clickstream data from the plurality of user sessions, the first clickstream data capturing user interactions with the graphical user interface of the software application;
extracting, from the first clickstream data, a first plurality of task instances of the first user performing a first plurality of tasks;
decomposing, from the first clickstream data, each task instance of the first plurality of task instances into a first plurality of steps to obtain a first plurality of decomposed task instances, wherein the first plurality of steps in the first plurality of decomposed task instances are each associated with a timestamp;
identifying in the first clickstream data from each user session a plurality of timestamps, wherein the plurality of timestamps includes an initial timestamp indicating a start of a task during a user session and an end timestamp indicating an end of the task, wherein the task is in the first plurality of tasks and the user session is in the plurality of user sessions;
calculating a duration of time to perform the task based on the initial timestamp and the end timestamp;
training a first user model with the first plurality of decomposed task instances to learn a user optimal order to perform the first plurality of tasks, wherein training the first user model uses the duration of time; and
presenting, to the first user, the user optimal order to perform the first plurality of tasks in an interactive graphical user interface of a task scheduler;
receiving at least one edit from the first user to the user optimal order via the interactive graphical user interface of the task scheduler; and
updating the user optimal order based on the at least one edit; and
presenting, after updating, the user optimal order in the interactive graphical user interface of the task scheduler.

2. The method of claim 1, further including detecting, in the software application, an initiation by the first user to perform the task in the first plurality of tasks, wherein the user optimal order is presented responsive to the detection.

3. The method of claim 1, wherein training the first user model comprises: determining, by the first user model, a dependency relationship between the first plurality of steps based on commonalities in an order of performing the first plurality of steps across the first plurality of decomposed task instances; and generating, based on the dependency relationship, the user optimal order that minimizes a duration for the first user to perform the first plurality of tasks.

4. The method of claim 1, wherein training the first user model comprises:
   determining, by the first user model, a redundancy in a first step in the first plurality of tasks and a second step in the first plurality of tasks; and
   generating, based upon the redundancy, the user optimal order that removes the redundancy.

5. The method of claim 4, wherein the user optimal order is different than the first user performing the first plurality of steps in any of the first plurality of task instances.

6. The method of claim 1, wherein presenting the user optimal order comprises: displaying, in a user interface of the software application, a step-by-step list of the first plurality of steps ordered according to the user optimal order, wherein, for at least a subset of steps, each step in the step-by-step list is displayed once a prior step is completed.

7. The method of claim 1, further comprising: obtaining second clickstream data of a plurality of users; extracting, from the second clickstream data, a second plurality of task instances of the plurality of users performing the first plurality of tasks; decomposing, from the second clickstream data, each task instance in the second plurality of task instances into a second plurality of steps to obtain a second plurality of decomposed task instances, wherein the second plurality of steps in the second plurality of decomposed task instances are each associated with the timestamp; training a global model with the second plurality of decomposed task instances to learn a global optimal order to perform the first plurality of tasks; detecting, in the software application, an initiation by a second user to perform a task; determining, for the second user, that a second user model does not exist for the task; selecting, for the second user and responsive to the second user model not existing, the global model; and presenting, to the second user, the global optimal order to perform the first plurality of tasks.

8. The method of claim 7, further comprising: relating each of the second plurality of task instances to a corresponding task identifier of a corresponding task in the first plurality of tasks, wherein extracting the first plurality of task instances comprises selecting a subset of the second plurality of task instances having the corresponding task identifier be the same amongst the task instances in the subset.

9. The method of claim 8, wherein relating a task instance of the second plurality of task instances to the corresponding task identifier comprises: extracting, from the first clickstream data, a plurality of page identifiers of a plurality of user interface pages of the software application; and matching at least one page identifier of the plurality of page identifiers to the corresponding task identifier in a mapping structure.

10. The method of claim 1, further comprising: filtering the first clickstream data to be at a page level granularity.

11. The method of claim 1, further comprising: performing, after updating the user optimal order based on the at least one edit from the first user, a next training iteration using the user optimal order as a starting point for the next training iteration.

12. The method of claim 1, further comprising: sending notifications to the first user using the graphical user interface of the software application according to a schedule set in the user optimal order.

13. A method, comprising:
   generating, during a plurality of user sessions of a first user with a graphical user interface of a software application, first clickstream data from the plurality of user sessions, the first clickstream data capturing user interactions with the graphical user interface of the software application;
   extracting, from the first clickstream data, a first plurality of task instances of the first user performing a first plurality of tasks;
   decomposing, from the first clickstream data, each task instance of the first plurality of task instances into a first plurality of steps to obtain a first plurality of decomposed task instances, wherein the first plurality of steps in the first plurality of decomposed task instances are each associated with a timestamp;
   training a first user model with the first plurality of decomposed task instances to learn a user optimal order to perform the first plurality of tasks;
   presenting, to the first user, the user optimal order to perform the first plurality of tasks in an interactive graphical user interface of a task scheduler;
   receiving at least one edit from the first user to the user optimal order via the interactive graphical user interface of the task scheduler;
   updating the user optimal order based on the at least one edit: presenting, after updating, the user optimal order in the interactive graphical user interface of the task scheduler;
   detecting, in the software application, an initiation by a second user to perform the task having a task identifier of a task of the first plurality of tasks;
   determining, for the second user, that a second user model does not exist for the task;
   selecting, for the second user and responsive to the second user model not existing, the first user model based on a determined similarity between the first user and the second user;
   and presenting, to the second user, the user optimal order to perform the task.

14. A system comprising:
   a server;
   a data repository in communication with the server and storing first clickstream data;
   and a scheduling application executable by the server to:
   generate, during a plurality of user sessions of a first user with a graphical user interface of a software application, the first clickstream data from the plurality of user sessions, the first clickstream data capturing user interactions with the graphical user interface of the software application, extract, from the first clickstream data, a first plurality of task instances of the first user performing a first plurality of tasks, decompose, from the first clickstream data, each task instance of the first plurality of task instances into a first plurality of steps to obtain a first plurality of decomposed task instances, wherein the first plurality of steps in the first plurality of decomposed task instances are each associated with a timestamp, train a first user model with the first plurality of decomposed task instances to learn a user optimal order to perform the first plurality of tasks, present, to the first user, the user optimal order to perform the first plurality of tasks in an interactive graphical user interface of a task scheduler, interactively updating the user optimal order by the interactive graphical user interface of the task scheduler based on input from the first user, obtain second clickstream data of a plurality of users, extract, from the second clickstream data, a second plurality of task instances of the plurality of users performing a first task of the first plurality of tasks, decompose, from the second clickstream data, each task instance in the second plurality of task instances into a second plurality of steps to obtain a second plurality of decomposed task instances, wherein the second plurality of steps in the second plurality of decomposed task instances are each associated with the timestamp, train a global model with the second plurality of decomposed task instances to learn a global optimal order to perform the first task, detect, in the software application, an initiation by a second user to perform the first task, determine, for the second user, that a second user model does not exist for the first task, select, for the second user and responsive to the second user model not existing, the global model, and present, to the second user, the global optimal order to perform the first task.

15. The system of claim 14, wherein the user optimal order is based on a determined dependency between the first plurality of steps.

16. The system of claim 14, wherein the scheduling application is further executable by the server to: extract, from the first clickstream data, a third plurality of task instances of the first user performing a second plurality of tasks, wherein the second plurality of tasks comprises the first task; and relate each of the second plurality of task instances to a corresponding task identifier of a corresponding task in the second plurality of tasks, wherein extracting the first plurality of task instances comprises selecting a subset of the second plurality of task instances having the corresponding task identifier to be the same amongst the task instances in the subset.

17. A method comprising:
generating, during a plurality of user sessions of a plurality of users with a software application, clickstream data from the plurality of user sessions;
extracting, from the clickstream data, a first plurality of task instances of a first user performing a first plurality of tasks;
decomposing, from the clickstream data, each task instance of the first plurality of task instances into a first plurality of steps to obtain a first plurality of decomposed task instances, wherein the first plurality of steps in the first plurality of decomposed task instances are each associated with a timestamp;
training a first user machine learning model with the first plurality of decomposed task instances to learn a user optimal order to perform the first plurality of tasks;
extracting, from the clickstream data, a second plurality of task instances of the plurality of users performing the first plurality of tasks;
decomposing, from the clickstream data, each task instance of the second plurality of task instances into a second plurality of steps to obtain a second plurality of decomposed task instances, wherein the second plurality of steps in the second plurality of decomposed task instances are each associated with the timestamp;
training a global machine learning model with the second plurality of decomposed task instances to learn a global optimal order to perform the first plurality of tasks;
detecting, in the software application, an initiation by the first user to perform a first task of the first plurality of tasks;
selecting a selected optimal order from the first user machine learning model and the global machine learning model; and
presenting, to the first user, the selected optimal order to perform the first plurality of tasks in an interactive graphical user interface of a task scheduler;
receiving at least one edit from the first user to the user optimal order via the interactive graphical user interface of the task scheduler; and
updating the user optimal order based on the at least one edit; and
presenting, after updating, the user optimal order in the interactive graphical user interface of the task scheduler.

18. The method of claim 17, further comprising:
detecting, in the software application, an initiation by a second user to perform the first task having a task identifier of the first task; and
determining, for the second user, that a second user model does not exist for the first task;
selecting, for the second user and responsive to the second user model not existing, the first user machine learning model based on a determined similarity between the first user and the second user; and
presenting, to the second user, the user optimal order to perform the first plurality of tasks.

19. The method of claim 17, further comprising: extracting, from the clickstream data, a third plurality of task instances of the first user performing a second plurality of tasks, wherein the second plurality of tasks comprises the first task; and relating each of the second plurality of task instances to a corresponding task identifier of a corresponding task in the second plurality of tasks, wherein extracting the first plurality of task instances comprises selecting a subset of the second plurality of task instances having the corresponding task identifier be the same amongst the task instances in the subset.

* * * * *